(12) United States Patent
Berberian et al.

(10) Patent No.: US 11,763,571 B2
(45) Date of Patent: *Sep. 19, 2023

(54) MONOCULAR CUED DETECTION OF THREE-DIMENSIONAL STRUCTURES FROM DEPTH IMAGES

(71) Applicant: MOBILEYE VISION TECHNOLOGIES LTD., Jerusalem (IL)

(72) Inventors: Oded Berberian, Jerusalem (IL); Gideon Stein, Jerusalem (IL)

(73) Assignee: MOBILEYE VISION TECHNOLOGIES LTD., Jerusalem (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/366,377

(22) Filed: Jul. 2, 2021

(65) Prior Publication Data

US 2021/0334557 A1 Oct. 28, 2021

Related U.S. Application Data

(63) Continuation of application No. 17/011,798, filed on Sep. 3, 2020, now Pat. No. 11,062,155, which is a
(Continued)

(51) Int. Cl.
G06K 9/00 (2022.01)
H04N 13/271 (2018.01)
(Continued)

(52) U.S. Cl.
CPC ............ *G06V 20/58* (2022.01); *G06V 20/588* (2022.01); *H04N 13/271* (2018.05)

(58) Field of Classification Search
None
See application file for complete search history.

(56) References Cited

U.S. PATENT DOCUMENTS 7,151,996 B2 12/2006 Stein
7,489,812 B2 2/2009 Fox
(Continued)

FOREIGN PATENT DOCUMENTS

EP 2256690 A1 12/2010
EP 2179398 B1 3/2011

OTHER PUBLICATIONS

Galup, D. et al., Variable Baseline/Resolution Stereo, Computer Vision and Pattern Recognition, 2008. CVPR 2008, IEEE Conference Publication Year: 2008, pp. 1-8.
(Continued)

*Primary Examiner* — Mohammad J Rahman
(74) *Attorney, Agent, or Firm* — Finnegan, Henderson, Farabow, Garrett & Dunner, LLP (57) ABSTRACT

Detection of three dimensional obstacles using a system mountable in a host vehicle including a camera connectible to a processor. Multiple image frames are captured in the field of view of the camera. In the image frames, an imaged feature is detected of an object in the environment of the vehicle. The image frames are portioned locally around the imaged feature to produce imaged portions of the image frames including the imaged feature. The image frames are processed to compute a depth map locally around the detected imaged feature in the image portions. Responsive to the depth map, it is determined if the object is an obstacle to the motion of the vehicle.

20 Claims, 5 Drawing Sheets

Related U.S. Application Data continuation of application No. 14/180,548, filed on Feb. 14, 2014, now Pat. No. 10,776,635, which is a continuation-in-part of application No. 13/237,163, filed on Sep. 20, 2011, now Pat. No. 9,280,711.

(60) Provisional application No. 61/765,748, filed on Feb. 17, 2013, provisional application No. 61/385,122, filed on Sep. 21, 2010.

(51) Int. Cl.
  *G06V 20/58* (2022.01)
  *G06V 20/56* (2022.01)

(56) References Cited

U.S. PATENT DOCUMENTS

| | | |
|---|---|---|
| 7,786,898 B2 | 8/2010 | Stein |
| 10,776,635 B2 | 9/2020 | Berberian |
| 2003/0040864 A1 | 2/2003 | Stein |
| 2003/0228034 A1 | 12/2003 | Fox et al. |
| 2004/0252863 A1 | 1/2004 | Chang |
| 2005/0049788 A1* | 3/2005 | Haider .............. G06V 20/58 348/148 |
| 2005/0232460 A1 | 10/2005 | Schmiz et al. |
| 2006/0013473 A1* | 1/2006 | Woodfill .............. G06T 1/20 382/154 |
| 2006/0221250 A1* | 10/2006 | Rossbach ............ H04N 23/84 348/663 |
| 2007/0255480 A1 | 11/2007 | Southall et al. |
| 2008/0036576 A1 | 2/2008 | Stein et al. |
| 2008/0159620 A1 | 7/2008 | Camus et al. |
| 2009/0243889 A1* | 10/2009 | Suhr .............. G08G 1/168 340/932.2 |
| 2009/0290811 A1 | 11/2009 | Imai |
| 2010/0177164 A1 | 7/2010 | Zalevsky et al. |
| 2010/0259539 A1* | 10/2010 | Papanikolopoulos ............ G06V 40/20 348/E13.074 |
| 2010/0323609 A1 | 12/2010 | Aramaki |
| 2011/0013201 A1 | 1/2011 | Scherl et al. |
| 2011/0093177 A1 | 4/2011 | Horn |
| 2011/0255741 A1 | 10/2011 | Jung et al. |
| 2011/0298895 A1* | 12/2011 | Tian .............. H04N 19/30 348/46 |
| 2011/0311108 A1 | 12/2011 | Badino et al. |
| 2012/0056982 A1* | 3/2012 | Katz .............. H04N 13/254 348/43 |
| 2013/0010067 A1 | 1/2013 | Veeraraghavan et al. |

OTHER PUBLICATIONS

Yu-Lun Chen, Masters Thesis, Department of Computing Science National Chengchi University, Chapter 3 Disparity and Depth Map Computation, Apr. 2006, pp. 27-37.

Brox, Thomas, et al., High accuracy optical flow estimation based on a theory for warping. Computer Vision—ECCV 2004. Springer Berlin Heidelberg, 2004, pp. 25-36.

C. Liu., Beyond pixels: exploring new representations and applications for motion analysis, Doctoral Thesis, Massachusetts Institute of Technology, May 2009, Appendix A pp. 143-148.

Berthold K.P., Determining Optical Flow, Artificial Intelligence 17 (1981), pp. 185-203.

Toulminet, G. et al., Vehicle Detection by Means of Stereo Vision-Based Obstacles Features Extraction and Monocular Pattern Analysis, IEEE Transactions on Image Processing, vol. 15, No. 8 (2006), pp. 2364-2375.

* cited by examiner

MONOCULAR CUED DETECTION OF THREE-DIMENSIONAL STRUCTURES FROM DEPTH IMAGES

CROSS REFERENCE TO RELATED APPLICATIONS

The present application is a continuation of U.S. patent application Ser. No. 17/011,798 filed on Sep. 3, 2020, which is a continuation of U.S. patent application Ser. No. 14/180,548 (now U.S. Pat. No. 10,776,635) filed on Feb. 14, 2014, which is a continuation in part application of U.S. patent application Ser. No. 13/237,163 (now U.S. Pat. No. 9,280,711) filed on Sep. 20, 2011. U.S. patent application Ser. No. 14/180,548 claims priority from U.S. provisional patent application 61/765,748 filed on Feb. 17, 2013. U.S. patent application Ser. No. 13/237,163 claims priority from U.S. provisional patent application 61/385,122 filed on Sep. 21, 2010. All of the foregoing applications are incorporated herein by reference in their entirety.

BACKGROUND

1. Technical Field

The present disclosure relates to detection of three-dimensional structures from two-dimensional images and particularly related to application in driver assistance systems

2. Description of Related Art

Structure-from-Motion (SfM) refers to methods for recovering three-dimensional information of a scene that has been projected onto the back focal plane of a camera. The structural information derived from a SfM algorithm may take the form of a set of projection matrices, one projection matrix per image frame, representing the relationship between a specific two-dimensional point in the image plane and its corresponding three-dimensional point. SfM algorithms rely on tracking specific image features from image frame to image frame to determine structural information concerning the scene.

Similarly, stereo or multi-ocular disparity analysis may be used to determine three-dimensional points from two-dimensional images. Finding structure from motion presents a similar problem as finding structure from stereo vision. In both instances, the correspondence between images and the reconstruction of three-dimensional object is found.

In three-dimensional computer graphics, a depth map is an image that contains information relating to the distance Z of surfaces of objects from a viewpoint; the viewpoint generally being the position of a camera.

The computation of depth maps from multiple images, either from a motion sequence and/or from multiple cameras is the subject of extensive research and numerous systems have been demonstrated. These systems are capable of producing dense depth map information but at considerable computational expense. Depth maps may also lack the full spatial resolution of the original gray scale images.

In multi-camera stereo, the epipolar geometry of the cameras is known and dense correspondences are computed by performing a search along the epipolar lines. Structure from Motion (SfM) techniques typically precede the dense epipolar search by computing the camera motion and epipolar geometry. In both cases, a smoothness function is explicitly or implicitly assumed so as to regularize the search and give robustness to noise and brightness changes. In the most straightforward approach, the search is performed by matching images patches rather than individual pixels.

The depth error $E_z$ in multi-camera stereo is a function of forward distance Z to the cameras, the correspondence error ($E_d$), image resolution (or focal length f in pixels) and the baseline b:

$$E_z = \frac{Z^2 E_d}{fb} \quad (1)$$

In SfM depth error is similar, however, the baseline b is replaced by the motion of the camera. Since the correspondence error ($E_d$) is finite, at best on the order of 0.25 pixels in optimal conditions, it may be considered to compute the depth map using data from the highest available image resolution. However, due to the computational cost, it is often inhibitive to compute a depth map at such a large resolution.

Thus there is a need for and it would be advantageous to have a driver assistance system and corresponding method adapted to detect three dimensional structures such as guard-rails, curbs or other three dimensional objects in the road environment from depth map images while avoiding intensive computational overhead normally associated with computing depth maps to allow for real time processing in the driver assistance system.

BRIEF SUMMARY

Various methods and systems are disclosed herein for detection of three dimensional obstacles. The systems are mountable in a host vehicle and a camera connectible to a processor. Multiple image frames are captured in the field of view of the camera. In the image frames, an imaged feature is detected of an object in the environment of the vehicle. The image frames are portioned locally around the imaged feature to produce imaged portions of the image frames including the imaged feature. The image frames are processed to compute a depth map locally around the detected imaged feature in the image portions. The depth map includes an image of the feature with a color or grayscale coordinate related to a function of distance from the camera to the object. Responsive to the depth map, it is determined if the object is an obstacle to the motion of the vehicle. The object may be represented with multiple models. Multiple model depth maps may be computed respectively of the multiple models. The depth map of the detected feature may be compared with the model depth maps and based on the comparison, it may be determined that the object is an obstacle or not an obstacle to the motion of the vehicle. The models may be a horizontal planar model, a vertical planar model, a mixed model including horizontal and vertical portions, a spherical model, a circular model, a model of a guard rail, a model of lane marker, a model of a road curb and a model of an upright pedestrian. The computation of the depth map may be performed only locally around the detected feature in the image portions. The resolution of the computation of the depth map may be adjusted only to achieve an accuracy required based on the imaged feature.

BRIEF DESCRIPTION OF THE DRAWINGS

The invention is herein described, by way of example only, with reference to the accompanying drawings, wherein.

DETAILED DESCRIPTION

Reference will now be made in detail to embodiments of the present invention, examples of which are illustrated in the accompanying drawings, wherein like reference numerals refer to the like elements throughout. The embodiments are described below to explain the present invention by referring to the figures.

Figure 1:
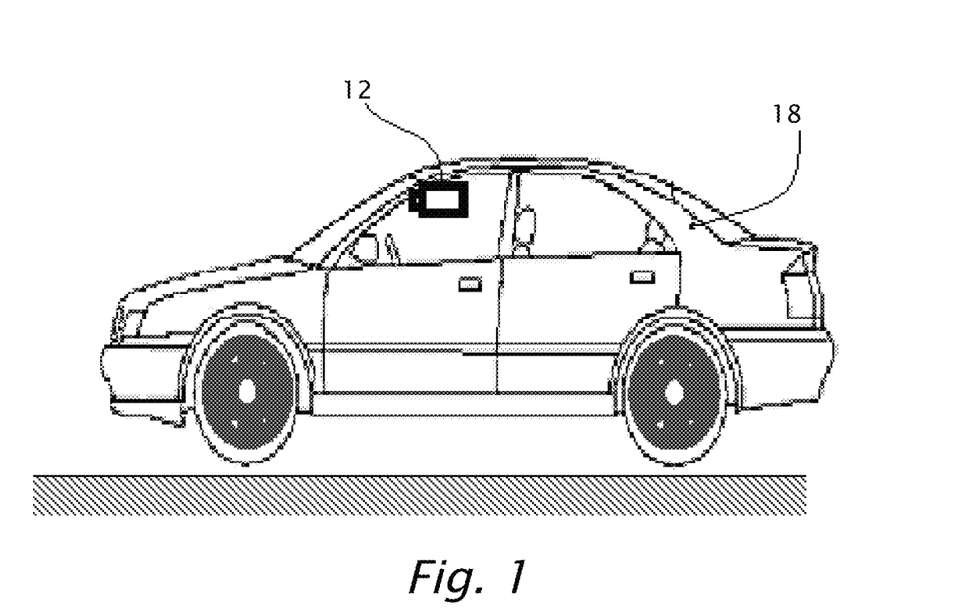
FIGS. 1 and 2 illustrate a system including a camera or image sensor mountable in a vehicle, according to an aspect of the present invention.
Figure 2:
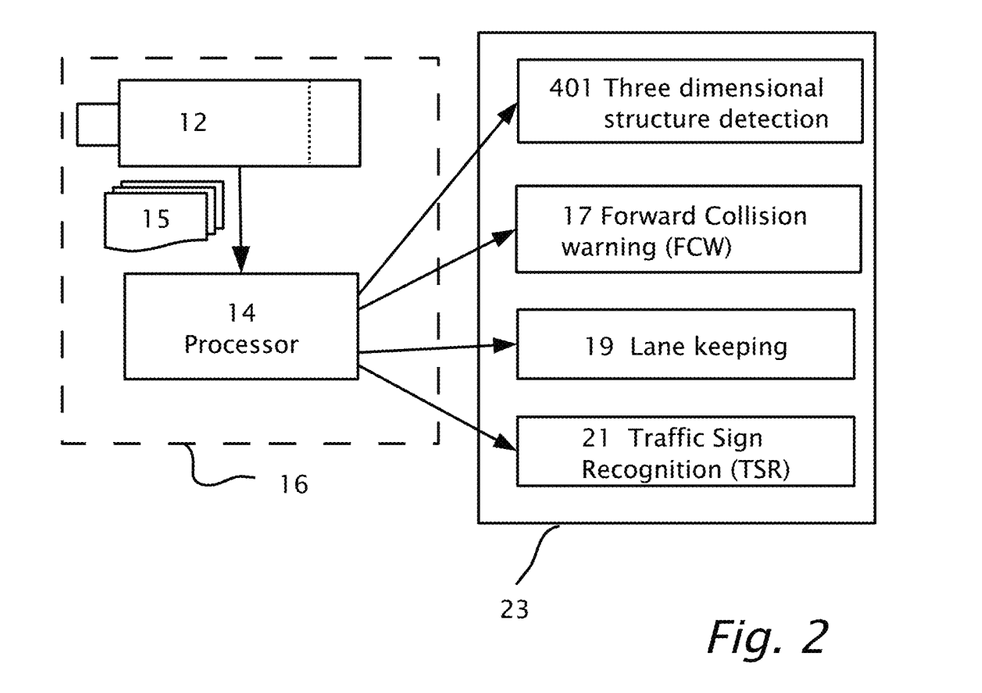

Referring now to the drawings, reference is now made to FIGS. 1 and 2 which illustrate a system 16 including a camera or image sensor 12 mountable in a vehicle 18, according to an aspect of the present invention. Image sensor 12, imaging a field of view in the forward direction typically delivers images in real time and the images may be captured in a time series of image frames 15. An image processor 14 may be used to process image frames 15 simultaneously and/or in parallel to serve a number of driver assistance systems. Image sensor 12 is typically monochrome or black-white, i.e. without color separation. By way of example in FIG. 2, image frames 15 may be used to serve a warning system 23 which may include collision warning 17, lane keeping 19, traffic sign recognition (TSR) 21 and three-dimensional structure, e.g. barrier and guard rai, 1 detection 401. Image processor 14 is used to process image frames 15 to detect three-dimensional structure in the forward field of view of camera 12. The terms "camera" and "image sensor" are used herein interchangeably. The detection of curbs, guard rails, structural barriers, e.g. concrete lane dividers is important for many driver assistance functions. Aspects of the present invention may include exchange of information between three-dimensional structure detection 401 and other driver assistance functions and/or systems including but not limited by FCW 17 and lane keeping 19. For example, a lane keeping 19 as part of system memory 23, may respond more strongly to a lane departure towards a guard rail or a barrier rather than a lane marker or even a white line. A Forward Collision Warning (FCW) system 19 may trigger sooner if the path to either side of in-path vehicle is blocked by a guard rail or another vehicle.

The term "object" as used herein refers to an object in real space being viewed by a camera. A curb along the edge of a road and a lane marker in the road are examples of objects. The term "image" refers to the image of one or more objects in image space at the focal plane of camera 12. Image coordinates (x,y) in small letters refer to image space and may be in arbitrary units or numbers of picture elements in the horizontal and vertical directions with the pixel dimensions assumed. The term "image motion" refers to motion of an image of an object in image space. From image frame 15 to a subsequent image frame 15 the points of the image of the object may map from one set of coordinates (x1,y1) to a different set of coordinates (x2,y2). The term "image motion" refers to the mapping of coordinates of an image from image frame to image frame or a function of the mapping. The term "projection" or "projecting" as used herein refers to camera or perspective projection from three dimensional space to a two dimensional image unless otherwise indicated by the context.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, embodiments of the present invention may be directed to an efficient method for detection of three-dimensional structures from depth map images using monocular cues. Monocular cues are used to detect candidate regions where a particular depth structure is expected and then the depth map is used verify the existence of the structure. The depth maps may be derived from a monocular sequence of images using 'structure from motion' (SfM) techniques or from multi-camera stereo.

Embodiments of the present invention may include methods which search for particular three-dimensional structures or classes of three-dimensional structure. Three-dimensional objects have both distinctive three-dimensional structure and two-dimensional image characteristics. A sphere for example has three-dimensional shape and also appears in the image as a circle. In the 'sphere' example, the first step is to detect circles in the gray scale or color image which is a monocular cue for sphere detection. Once candidate circles are detected, the diameter of the circle in the image and the distance Z from the camera to the real-space sphere may define the three-dimensional diameter of the respective three-dimensional sphere. A depth map of the imaged circle may be computed using either SfM or multi-ocular (stereo vision) techniques. One may compute a first model associated with a three-dimensional depth model of a convex sphere, a second model associated with a flat circle, and possibly a third model three-dimensional depth model associated with a concave sphere. By comparing the computed depth map to the three models one can simply and inexpensively determine whether or not the imaged circle is a sphere in three-dimensional space.

The next section shows in detail how the same technique can be applied to curb and barrier detection by a monocular camera 12 mounted on vehicle 18. As discussed above, curb and barrier detection 401 has many uses in Driver Assistance Systems (DAS) such as lane keeping 19, escape route determination, forward collision warning 17, and automatic headlight control (AHC).

Figure 3A:
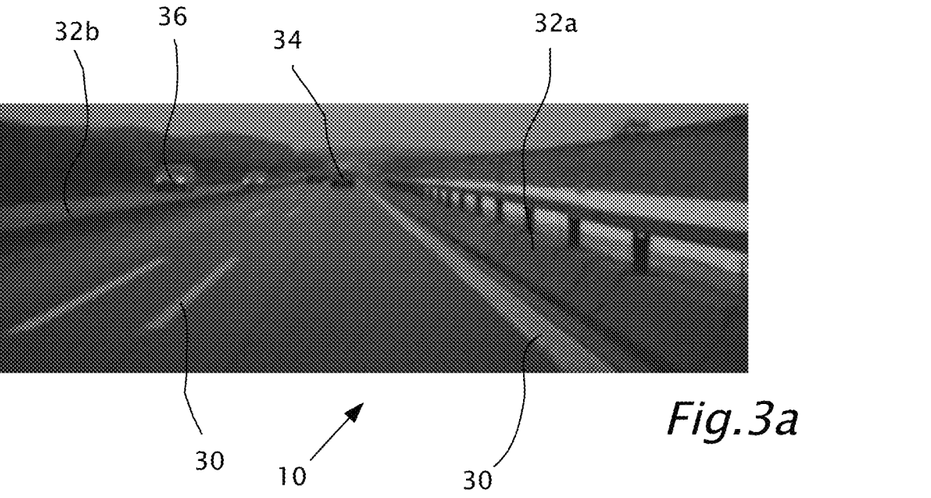
FIG. 3*a* shows a typical partial road scene, according to a feature of the present invention.

Reference is now made to FIG. 3*a* which shows a typical partial road scene 10, according to a feature of the present invention. Road scene 10 shows a partial image frame 15 (the sky portion of the image frame 15 is only partially shown) as captured by camera 12 mounted in host vehicle 18. In road scene 10 are barriers 32*a* and 32*b*. Barrier 32*a* has concrete base and vertical metal upright posts protruding out form the concrete base onto which is mounted a horizontal metal rail. Barrier 32b appears to be just a barrier made from concrete. Road scene 10 also includes examples road markings 30 as well as lead vehicles 34 and oncoming vehicles 36.

Figure 3B:
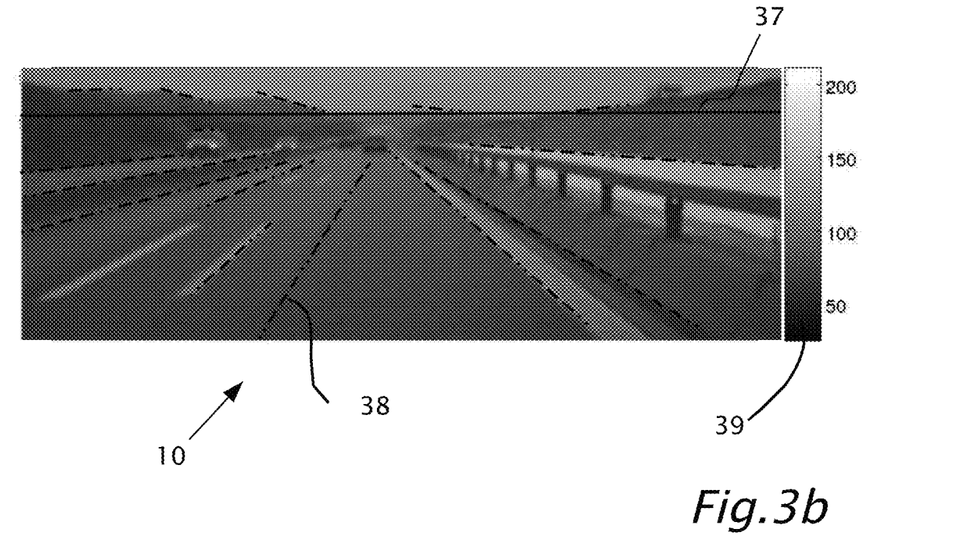
FIG. 3*b* shows further details of the same road scene as shown in FIG. 3*a*, according to a feature of the present invention.

Reference is now made to FIG. 3b which shows further details of the same road scene as 10 shown in FIG. 3a, according to a feature of the present invention. To the right of road scene 10 is shown a gray scale value map 39 with gray scale values. Distinctive lines associated with lane markings, curbs, barriers, hill contours and the roof of an oncoming vehicle 36 in the road environment appear as almost straight in the image frame 15 as indicated by dotted lines 38. The approximate position of the horizon 37 in image frame 15 is also shown by a solid line.

Detecting Curbs and Barriers Structures from Monocular Cues

Curbs and barriers 32 along the road may be associated with three-dimensional structures with an L shaped cross-section and with lines in the gray scale image. A line appears where the three-dimensional structure changes from horizontal road to vertical curb edge or barrier 32.

Image lines associated with lane markings 30, curbs and barriers 32 in the road environment appear most often almost straight in the image. Even on curved roads, due to perspective, lane markings 30 and curbs appear straight closer to the vehicle, between twenty and thirty meters, and the curve appears only at longer ranges. The example as follows therefore uses features in the road environment which are represented by straight lines in image space as models.

Figure 4:
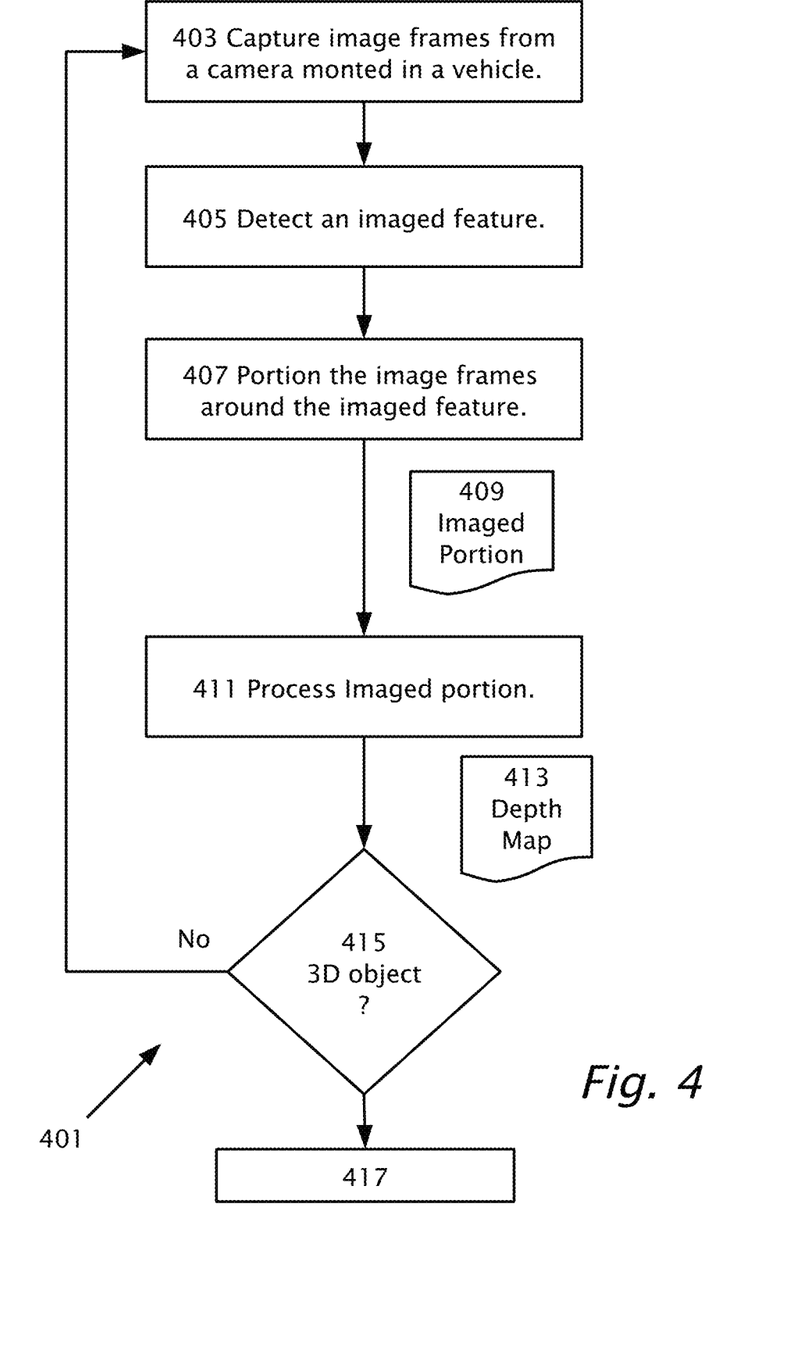
FIG. 4 shows a method, according to a feature of the present invention.

Reference is now made to FIG. 4 which shows a method 401, according to a feature of the present invention. Method 401 may be used for detection of three dimensional obstacles such as barriers 32a or 32b for example. Method 401 is for straight lines but may be easily be extended to curved lines 'parallel' to the road skeleton or elongated lines in general as per techniques described for detecting the road skeleton in U.S. Pat. No. 7,151,996. In step 403, image frames 15 are captured in the field of view of camera 12. In step 405, image features such as lines indicated by dotted lines 38 (FIG. 3b) of a minimum length may be detected in image frame 15. Lines which are below the horizon 37 are candidates for being on the road, at the bottom of barriers 32 or curb. In step 407, a strip in image frame 15 may be portioned around a line to give an imaged portion 409. In step 411, imaged portion 409 may be processed. A depth map 413 for each candidate image portions 409 may include a color or gray scale coordinate related to a function of distance (Z) from the camera 12 to the lines. For each candidate image portion 409, three models (a), (b) and (c) may be computed by way of example:

(a) A horizontal surface model (FIG. 5e) if both sides of the imaged line are road images (horizontal surface). For example, all points on the image row have the same depth value associated with the line pixel on that row.
(b) A vertical surface model (FIG. 5c) if both sides of the imaged line are imaged barrier (vertical surface). For example, all points on the same image column have the same depth value associated with the line pixel on that column.
(c) An L-shaped model (FIG. 5d) A barrier or curb model if the part of the patch inner from the imaged line is imaged road and patch outer of the imaged line is imaged vertical barrier 32 or curb. For example all points along a row inner from the line have a depth value associated with the depth value of the line pixel on that row AND all points along a column outer from the line have a depth value associated with the depth value of the line pixel on that column.

Further in decision block 415, depth map 413 of imaged portions 409 around an image feature, e.g. line 38 is compared with each of the three models (a), (b) and (c). The comparison may be performed by correlation or by computing the sum of squared differences (SSD) or sum of absolute differences (SAD) between actual depth map 413 of imaged portion 409 and each of the three models.

In decision 415, the best score gives the correct real-space structure whether the imaged portions 409 include a three-dimensional structure: barrier or curb, a vertical surface or a road surface. If imaged portions 409 include an object which is an obstacle to the motion of vehicle 18 a warning may be issued to the driver of vehicle 18 in step 417, or collision avoidance may be initiated by providing a control feature of host vehicle 18 such as automatic breaking or steering of host vehicle 18 to avoid the obstacle found in decision block 415. Otherwise capturing of image frames 15 continues in step 403.

The depth value for the pixels on a line can be taken directly from a low resolution depth image. Alternatively one can perform a robust fit of depth map 413 values to a line in three-dimensional space and then the depth value of the three-dimensional line may be used.

Because the gray scale line might not exactly correspond to the bend in the L shape (e.g. This happens when the curbstone is a molded L shape in concrete and the lane is asphalt), the same process can be repeated for line shifted a few pixels laterally in and out to get better coverage.

The depth values of the vertical and horizontal models can also be derived by fitting the depth map 413 to planar models:

$$\frac{1}{Z} = Ax + B \tag{2}$$

for vertical surfaces or:

$$\frac{1}{Z} = Cy + D \tag{3}$$

for horizontal surfaces, where x and y are the image column and row respectively and A,B,C,D are the derived model parameters. Robust fitting using random sample consensus (RANSAC) can be performed.

Figures 5A, 5B:
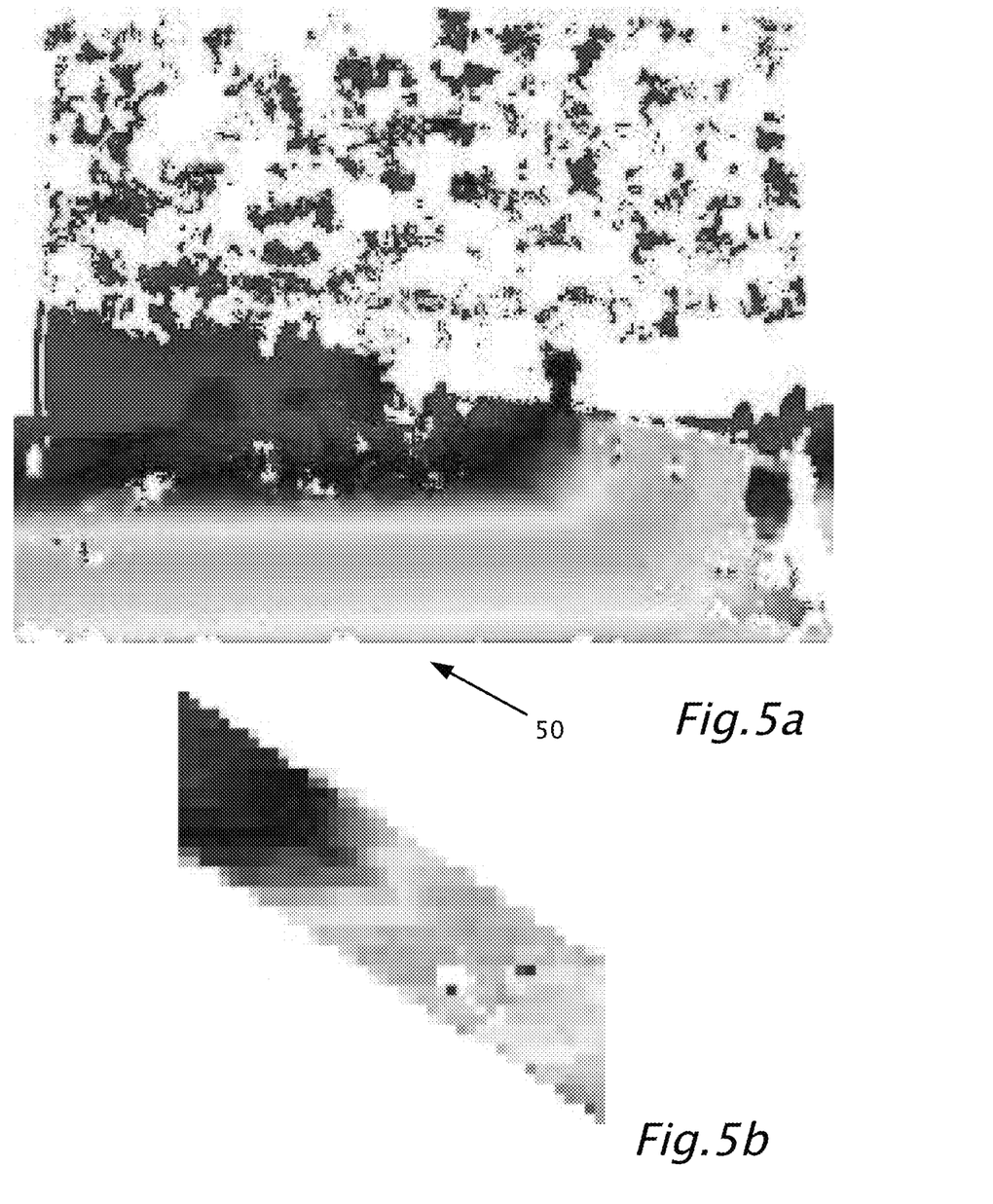
FIG. 5*a* shows an associated (inverse) depth map, according to a feature of the present invention.
FIG. 5*b* shows the depth map patch around one candidate line, according to a feature of the present invention.
Figure 5C:
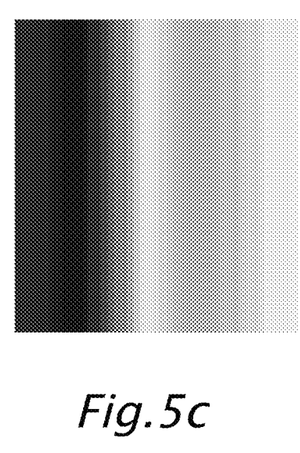
FIGS. 5*c*, 5*d*, and 5*e* show three models of vertical surface, L shape model and horizontal surface, according to a feature of the present invention.

Reference is now made to FIG. 5a which shows an associated (inverse) depth map 50, according to a feature of the present invention. Depth map 50 is computed for the full image frame 15 of FIGS. 3a, 3b and a few preceding image frames 15. Light gray is close and dark gray is far away.

Figure 5D:
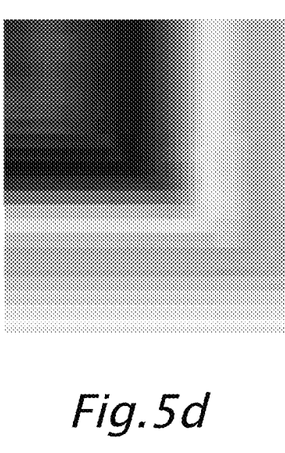
Figure 5E:
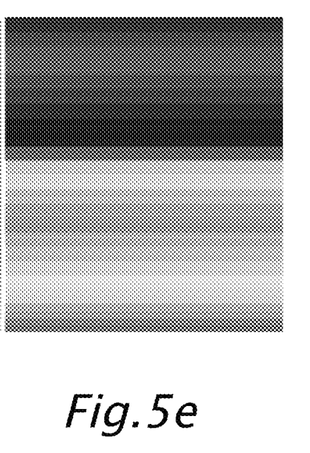
Figure 5F:
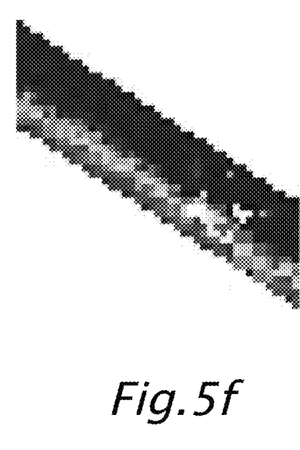
FIGS. 5*f*, 5*g* and 5*h* show difference images between the depth map patch and the three models of FIGS. 5*c*, 5*d*, and 5*e* respectively, according to a feature of the present invention.
Figure 5G:
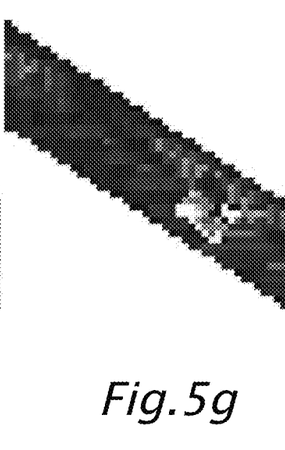
Figure 5H:
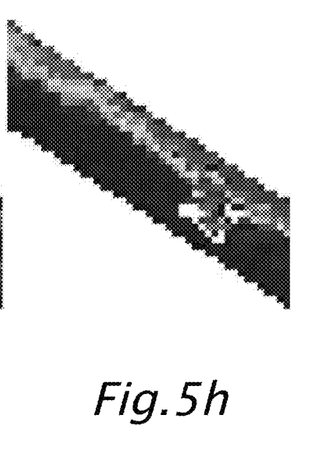

FIG. 5b shows the depth map patch around one candidate line, according to a feature of the present invention. The three models of vertical surface, L shape model and horizontal surface are show in FIGS. 5c, 5d, 5e and the difference images between the depth map patch and the three models are shown respectively in FIGS. 5f, 5g and 5h. Dark gray indicates small difference and lighter gray a large difference. The L shaped model shown is FIG. 5d is clearly a better fit as shown by higher uniformity in FIG. 5g.

Monocular Cueing for Efficient Computation

As discussed earlier in the background, computing a dense depth map using full resolution gray scale data can be very computationally expensive, using the full resolution gives better depth accuracy however, such accuracy is not required uniformly over the whole image and for all applications.

There are two more efficient approaches:
1. Compute the dense depth map only where necessary If the application is curb detection then one need only compute the dense depth map around the line candidates (steps 407 and 411). Starting from the innermost line candidates, compute a dense depth map using the highest resolution available only for the patches around those candidates. If they are determined to be 'road' then move to the next outer candidate. If they are determined to be L or 'vertical' there is no need to compute the accurate dense depth map for candidates further out.
2. Adjust the accuracy of the depth map to the task required Curb detection requires very accurate depth map computation. However, such accuracy is often unnecessary for other applications. Detecting barriers 32 of 0.5 m height or above can be performed using lower accuracy depth maps 413. Higher accuracy would be applied to line candidates for curb detection.

There are other examples, Robust estimate of the dominant ground plane can be performed using both lower spatial resolution and lower accuracy. After the dominant ground plane is computed, higher accuracy depth maps can be computed along the predicted host vehicle 18 path. This can be used for obstacle detection. Higher accuracy still, can be used along the exact wheel tracks to be used for road profile estimation for adjusting active and semi-active suspensions.

Sphere detection could use a rough distance and the diameter of the circle in the image to estimate the expected three-dimensional sphere diameter. The rough distance and the diameter of the circle in the image to estimate the expected three-dimensional sphere diameter values can be used to adjust the resolution used for the dense map to be sufficient to differentiate from a flat surface but not more than required.

A similar approach is useful for pedestrian detection. If a suspect pedestrian target is detected with a suspect vehicle detected behind, the accuracy can be adjusted so as to be able to confirm the presence of both object and differentiate between them but not more than required.

Furthermore, due to the smoothness constraints used in the dense correspondence computation the depth map would be limited in information at spatial frequencies. Thus, the most practical solution is to use gray scale image information at the highest available resolution (eg. 640×480) to compute a depth map image of lower resolution (e.g. 320×240).

The term "depth map" as used herein is an image that contains information relating to the distance Z of object surfaces from a viewpoint; the viewpoint generally being the position of the camera.

The term "structural barrier" as used herein is a road barrier installed and extending along a road at the side of a road, at the median of a divided highway or as a lane divider. The structural barrier may be a concrete barrier, Jersey barrier, a metal guard rail or a cable barrier. The terms "structural barrier" and "vertical structural barrier" are used herein interchangeably.

The term "locally" as used herein refers to portioning an image to include only a detected feature and no other image features.

The term "high resolution" as used herein refers to single pixel or sub-pixel resolution. The term "accurate" as used herein refers to the determined position of an obstacle relative to a camera as compared with the true or actual position. of the obstacle.

The term "posts" as used herein refers to an imageable vertical texture in a structural barrier and may include any vertical structure or surface texture, e.g painted stripes, or the anti-glare slats. Hence, the terms "vertical texture" and "post" are used herein interchangeably.

The term "capture" as used herein refers to the real time recording and/or storage of image frames in a memory, for example volatile and/or non-volatile memory accessible by a processor.

The term "warping" as used herein refers to a transform from image space to image space.

The term "homography" as used herein refers to an invertible transformation from a projective space to itself that maps straight lines to straight lines. In the field of computer vision, two images of the same planar surface in space are related by a homography assuming a pinhole camera model.

The term "relative scale change" as used herein refers to the overall scale change in image coordinates dependent upon distance Z to a camera.

The indefinite articles "a" and "an" is used herein, such as "a depth map", "a line" have the meaning of "one or more" that is "one or more depth maps" or "one or more lines".
Summary of US Patent Publication 2012/0069185, application Ser. No. 13/237,163

Various methods are disclosed herein for detecting a structural barrier extending along a road. The methods are performable by a driver assistance system mountable in a host vehicle. The driver assistance system may include a camera operatively connected to a processor. Multiple image frames may be captured in the forward field of view of the camera. In the image frames, motion of images of the barrier are processed to detect the barrier. The camera may be a single camera. The motion of the images may be responsive to forward motion of the host vehicle and/or the motion of the images may be responsive to lateral motion of the host vehicle.

The structural barrier may include multiple posts. Multiple linear image structures are hypothesized in an image frame as projections of the barrier onto the road surface and multiple vertical image coordinates are obtained respectively from the linear image structures. The linear image structures may be image lines which run parallel to the image of the road and intersect the vanishing point of the image of the lane markers.

Multiple forward distances and corresponding lateral distances to the posts are computed based on the vertical image coordinates. Based on the known forward motion of the host vehicle and horizontal image coordinates of the linear image structures new horizontal image coordinates of the linear image structures are computed. The horizontal image coordinate in a second image frame of one of the images of the linear image structures is selected to align an image of one of the posts.

Alternatively, for each of the posts, forward distances from the host vehicle to the posts may be determined based on the motion of the images and the forward motion of the host vehicle. Lateral distances to the posts from the host vehicle may be determined from the forward distances and the horizontal image coordinates of the posts. Road plane lines at the lateral distances may be hypothesized to form multiple hypothesized road plane lines as projections of the vertical structural barrier onto the road surface. The hypothesized road plane lines at the lateral distances may be projected onto an image of the vertical structural barrier in an image frame. The correct road plane line is selected from the hypothesized road plane lines by aligning the correct road plane line with the image of the vertical structural barrier in the image frame.

Alternatively for a barrier without substantial vertical image texture, an image patch may be located in one of the image frames on an image line intersecting the vanishing point in the image frame. The image patch may be warped based on a vertical surface model. The vertical structural barrier may be detected by ascertaining that the patch is an image of the vertical structural barrier when points in columns of the patch scale vertically with host vehicle motion. Alternatively, the image patch may be warped based on a road surface model, and the patch may be an image of the road surface when points in rows of the patch scale horizontally with host vehicle motion. Various driver assistance systems may be provided for detecting a structural barrier extending along a road, The driver assistance system may be mountable in a host vehicle.

The camera may capture multiple image frames in the forward field of view of the camera. A processor may process motion of images of the barrier in the image frames. The camera may be a single camera. The camera may be configured to view in the direction of forward motion of the host vehicle. The motion of the images may be responsive to forward motion of the host vehicle and/or the motion of the images may be responsive to lateral motion of the host vehicle.

The motion of the images of the structural barrier may correlate with an image line in the direction of the vanishing point of the road, wherein the image line corresponds to a vertical projection of the structural barrier onto the road plane. The processor may be operable to hypothesize linear image structures as projections of the structural barrier onto the road plane to produce multiple hypotheses. Each of the hypotheses gives a lateral position of the barrier relative to the host vehicle. For each hypothesis, the lateral positions and host vehicle motion are used to predict image motion. The predicted image motion is compared to the actual image motion to verify the hypothesis and to derive the actual lateral position of the structural barrier relative to the host vehicle. Motion of the host vehicle may have a lateral component relative to the road direction and the image motion is of an image line in the image that is above the linear image structure.

The image line may be that of the top of the barrier. Vertical motion or looming of the image line may be used to determine lateral distance between the host vehicle and the structural barrier to determine whether the image line is of the same lateral distance as the linear image structure (the barrier) or on the road surface farther away. The processor may be operable to hypothesize multiple linear image structures in an image frame as projections of the barrier onto the road surface and obtain thereby multiple vertical image coordinates respectively from the linear image structures. The processor may be operable to compute multiple forward distances and corresponding lateral distances to the posts based on the vertical image coordinates. Based on the known forward motion of the host vehicle and horizontal image coordinates of the linear image structures, the processor may be operable to compute new horizontal image coordinates of the linear image structures to select the horizontal image coordinate in a second image frame of one of the images of the linear image structures and to align an image of one of the posts.

Alternatively, for each of the posts, the processor may be operable to determine forward distances from the host vehicle to the posts based on the motion of the images and the forward motion of the host vehicle. The processor may be operable to compute lateral distances to the posts from the host vehicle from the forward distance and horizontal image coordinates x of the posts. The processor may be operable to hypothesize road plane lines at the lateral distances, to form multiple hypothesized road plane lines as projections of the structural barrier onto the road surface; to project the hypothesized road plane lines at the lateral distances onto an image of the structural barrier in an image frame. The processor may be operable to select the correct road plane line from the hypothesized road plane lines by aligning the correct road plane line with the image of the structural barrier in the image frame Alternatively for a barrier without substantial vertical image texture, the processor may be operable to locate in one of the image frames an image patch on an image line intersecting the vanishing point in an image frame, to warp said image patch based on a vertical surface model and to detect the structural barrier by ascertaining that the patch may be an image of the structural barrier when points in columns of the patch scale vertically with host vehicle motion. Or, the processor may be operable to ascertain that the patch may be an image of the road surface if or when points in rows of the patch scale horizontally with host vehicle motion.

Although selected embodiments of the present invention have been shown and described, it is to be understood the present invention is not limited to the described embodiments. Instead, it is to be appreciated that changes may be made to these embodiments, the scope of which is defined by the claims and the equivalents thereof.

We claim:

1. A navigation system for a host vehicle, the system comprising:
    at least one processor configured to:
        receive a plurality of two-dimensional image frames captured by a camera from an environment of the host vehicle;
        detect, from the plurality of two-dimensional image frames, a two-dimensional feature of a three-dimensional imaged feature from the environment of the host vehicle using monocular information provided by the camera;
        after detecting the two-dimensional feature using the monocular information, generate, based on the plurality of two-dimensional image frames, a depth map of the two-dimensional feature, the depth map representing a distance from the camera to the imaged feature;
        compare the depth map of the two-dimensional feature with one or more reference maps to determine whether the imaged feature is an obstacle to a motion of the host vehicle; and
        cause implementation of a navigational action based on a result of the determination that the imaged feature is an obstacle.

2. The system of claim 1, wherein at least one of the one or more reference maps comprises a reference depth map.

3. The system of claim 1, wherein the at least one processor is further configured to recognize a type of object associated with the imaged feature.

4. The system of claim 3, wherein the at least one processor is further configured to recognize the type of object associated with the imaged feature based on a comparison of the depth map of the two-dimensional feature with the one or more reference maps.

5. The system of claim 1, wherein at least one of the one or more reference maps comprises a two-dimensional model.

6. The system of claim 5, wherein the two-dimensional model comprises at least one of: a horizontal planar model, a vertical planar model, a mixed model including horizontal and vertical portions, or a circular model.

7. The system of claim 1, wherein at least one of the one or more reference maps comprises a three-dimensional model.

8. The system of claim 7, wherein the three-dimensional model comprises a spherical model.

9. The system of claim 1, wherein at least one of the one or more reference maps comprises a reference model of a particular object type.

10. The system of claim 9, wherein the reference model of a particular object type comprises at least one of: a model of a guard rail, a model of lane marker, a model of a road curb, or a model of an upright pedestrian.

11. The system of claim 1, wherein at least one of the one or more reference maps comprises at least one of: a horizontal planar model, a vertical planar model, a mixed model including horizontal and vertical portions, a spherical model, a circular model, a model of a guard rail, a model of lane marker, a model of a road curb, or a model of an upright pedestrian.

12. The system of claim 1, wherein the at least one processor is further configured to provide a warning indicating the obstacle.

13. The system of claim 1, wherein the navigational action comprises a breaking of the host vehicle.

14. The system of claim 1, wherein the navigational action comprises a steering of the host vehicle.

15. The system of claim 1, wherein the camera comprises a monochrome camera.

16. The system of claim 1, wherein the camera is configured to view in a direction of forward motion of the host vehicle.

17. The system of claim 1, wherein generating the depth map of the two dimensional feature comprises:
   generating one or more low-resolution image portions of at least one of the plurality of two-dimensional image frames; and
   computing at least one depth value of the depth map based on the one or more low-resolution image portions.

18. The system of claim 17, wherein generating one or more low-resolution image portions of the at least one of the plurality of two-dimensional image frames comprises:
   detecting, in the plurality of two-dimensional image frames, a two-dimensional line associated with the three-dimensional imaged feature; and
   divided the at least one of the plurality of two-dimensional image frames around the two-dimensional line to generate the one or more low-resolution image portions.

19. A method for navigating a host vehicle, the method comprising:
   receiving a plurality of two-dimensional image frames captured by a camera from an environment of the host vehicle;
   detecting, from the plurality of two-dimensional image frames, a two-dimensional feature of a three-dimensional imaged feature from the environment of the host vehicle using monocular information provided by the camera;
   after detecting the two-dimensional feature using the monocular information, generating, based on the plurality of two-dimensional image frames, a depth map of the two-dimensional feature, the depth map representing a distance from the camera to the imaged feature;
   comparing the depth map of the two-dimensional feature with one or more reference maps to determine whether the imaged feature is an obstacle to a motion of the host vehicle; and
   causing implementation of a navigational action based on a result of the determination that the imaged feature is an obstacle.

20. A non-transitory computer-readable medium storing instructions that, when executed by a processing device, cause the processing device to perform a method comprising:
   receiving a plurality of two-dimensional image frames captured by a camera from an environment of a host vehicle;
   detecting, from the plurality of two-dimensional image frames, a two-dimensional feature of a three-dimensional imaged feature from the environment of the host vehicle using monocular information provided by the camera;
   after detecting the two-dimensional feature using the monocular information, generating, based on the plurality of two-dimensional image frames, a depth map of the two dimensional feature, the depth map representing a distance from the camera to the imaged feature;
   comparing the depth map of the two-dimensional feature with one or more reference maps to determine whether the imaged feature is an obstacle to a motion of the host vehicle; and
   causing implementation of a navigational action based on a result of the determination that the imaged feature is an obstacle.

* * * * *